United States Patent
Trajković

(10) Patent No.: US 7,003,150 B2
(45) Date of Patent: Feb. 21, 2006

(54) HOMOGRAPHY TRANSFER FROM POINT MATCHES

(75) Inventor: Miroslav Trajković, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 580 days.

(21) Appl. No.: 09/992,922

(22) Filed: Nov. 5, 2001

(65) Prior Publication Data
US 2003/0086602 A1    May 8, 2003

(51) Int. Cl.
G06K 9/36    (2006.01)

(52) U.S. Cl. .................................. 382/154; 382/294
(58) Field of Classification Search ............... 382/277, 382/285, 291, 294, 300, 154, 284, 287; 345/419, 345/422, 424, 427, 420; 348/40, 42
See application file for complete search history.

(56) References Cited

U.S. PATENT DOCUMENTS

| | | | | |
|---|---|---|---|---|
| 5,821,943 A * | 10/1998 | Shashua | ..................... | 345/427 |
| 6,094,198 A * | 7/2000 | Shashua | ..................... | 345/419 |
| 6,097,854 A | 8/2000 | Szeliski et al. | ............. | 382/284 |
| 6,137,491 A * | 10/2000 | Szeliski | ..................... | 345/419 |
| 6,192,145 B1 * | 2/2001 | Anandan et al. | ............ | 382/154 |
| 6,198,852 B1 * | 3/2001 | Anandan et al. | ............ | 382/284 |
| 6,353,678 B1 * | 3/2002 | Guo et al. | .................. | 382/154 |
| 6,487,304 B1 * | 11/2002 | Szeliski | ....................... | 382/107 |
| 6,527,395 B1 * | 3/2003 | Raskar et al. | ................. | 353/70 |
| 6,608,923 B1 * | 8/2003 | Zhang et al. | ............... | 382/154 |
| 6,668,080 B1 * | 12/2003 | Torr et al. | ................... | 382/173 |
| 6,715,888 B1 * | 4/2004 | Raskar et al. | ................. | 353/94 |

OTHER PUBLICATIONS

"Homography-based 3D Scene Analysis of Video Sequences", by Mei Han et al., 1998.
Visualisation Across Networks using Graphics and Uncalibrated Acquisition of Real Data (VANGUARD), pp. 7-10, 1999.
"Clasification of Edges under Motion", by L. Paletta et al 1997.
"Using Collineations to Compute Motion and Structure in an Uncalibrated Image Sequence", by T. Vieville et al., 1996, pp. 5-17.

* cited by examiner

*Primary Examiner*—Daniel Miriam

(57) ABSTRACT

An infinity homography for an image pair within an image sequence is transferred to other image pairs within the image sequence utilizing point matches for the subject image pairs. An image set including the image pair for which the infinity homography is known and a third image are selected. Then intermediate parameters for homography transfer for one image pair overlapping the known infinity homography image pair is computed from the known infinity homography and epipoles and fundamental matrices of the overlapping image pairs, to derive the infinity homography for the selected overlapping image pair. The process may then be repeated until infinity homographies for all image pairs of interest within the image sequence have been derived.

17 Claims, 3 Drawing Sheets

HOMOGRAPHY TRANSFER FROM POINT MATCHES

TECHNICAL FIELD OF THE INVENTION

The present invention is directed, in general, to view morphing for three dimensional video image generation and, more specifically, to use of homography transfer and epipolar geometry for computing homographies in extended image sequences.

BACKGROUND OF THE INVENTION

A homography is a linear projective transformation relating two images for either of two cases: (1) a planar world object projected onto image planes for the two images, where the image planes relate to arbitrary camera motion; or (2) the projection of arbitrary world images onto image planes for pure camera rotation only. A pinhole camera model illustrated in FIG. 4A is employed for the first view to define the location within the camera reference frame (x, y, and z, where z is the optical axis) of an image point m representing the intersection of a line containing a three dimensional world point W and the camera's optical center C with an image plane R. The projection of the optical center C' for a similar pinhole camera representing the second view onto the image plane R of the first camera or view, illustrated in FIG. 4B, is epipole e, and epipole e' is similarly the projection of the optical center C onto the image plane R' of the second camera or view.

The image points m (defined by coordinates x,y) and m' (defined by coordinates x',y'), which represent the projection of the image pixel W onto the image planes R and R', respectively, constitute a conjugate pair, and a fundamental matrix F relating such conjugate pairs may be computed (see, e.g., "Epipolar Geometry and the Fundamental Matrix" in R. Hartley & A. Zisserman, *Multiple View Geometry in Computer Vision*, pp. 219–242 (Cambridge University Press 2000), incorporated herein by reference) and employed to develop a 3×3 homography matrix $H_{12}$ for projective mapping of image points from the first camera or view reference frame to the second according to the linear projective equation:

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix},$$

which may be equivalently written as:

$$x' = \frac{h_{11}x + h_{12}y + h_{13}}{h_{31}x + h_{32}y + h_{33}}$$

$$y' = \frac{h_{21}x + h_{22}y + h_{23}}{h_{31}x + h_{32}y + h_{33}}.$$

Homography describes a one-to-one point mapping between the two images for either pure rotation by the camera or for world image points within a plane. The homography matrix for the plane at infinity $H_{12\infty}$, which maps vanishing points to vanishing points, is an important case and depends only on the rotational component of the rigid displacement.

Computation of homography is a very important and difficult task in, for example, three dimensional (3D) video generation and rendering. This is especially true for computation of the homography matrix for the plane at infinity, which requires knowledge of either (1) three sets or parallel lines, (2) point matches between the views corresponding to points very far away from the camera, or (3) complete camera calibration parameters. None of these is easy to compute for the general case.

There is, therefore, a need in the art for a simplified method of computing the homography matrix for the plane at infinity, particularly in extended image sequences.

SUMMARY OF THE INVENTION

To address the above-discussed deficiencies of the prior art, it is a primary object of the present invention to provide, for use in video system, transfer of an infinity homography for an image pair within an image sequence to other image pairs within the image sequence utilizing point matches for the subject image pairs. An image set including the image pair for which the infinity homography is known and a third image are selected. Then intermediate parameters for infinity homography transfer for one image pair overlapping the known infinity homography image pair are computed from the known infinity homography and epipoles and fundamental matrices of the overlapping image pairs, to derive the infinity homography for the selected overlapping image pair. The process may then be repeated until infinity homographies for all image pairs of interest within the image sequence have been derived.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
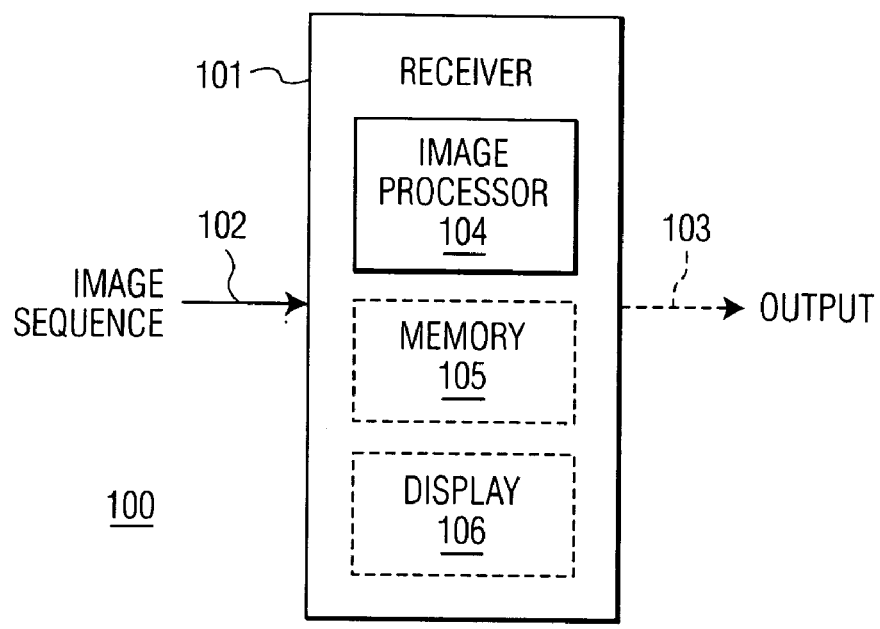
FIG. 1 depicts a block diagram of a video system employing a method of homography transfer utilizing point matches according to one embodiment of the present invention.
Figure 2:
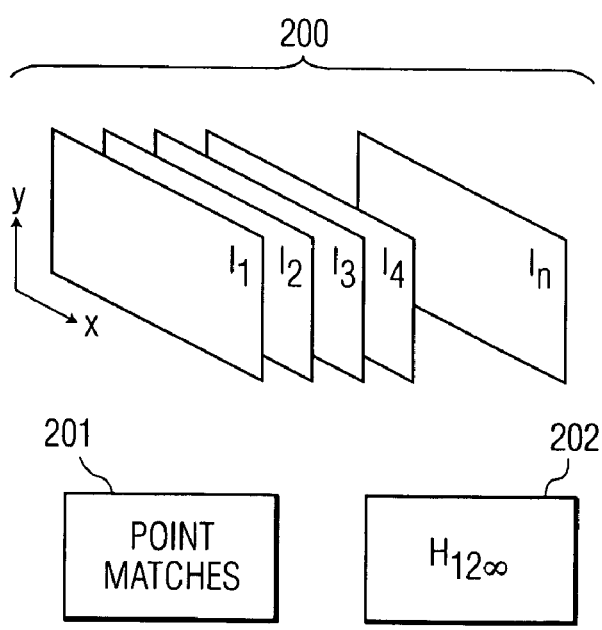
FIG. 2 depicts image data employed in computing homography transfer utilizing point matches according to one embodiment of the present invention.
Figure 3:
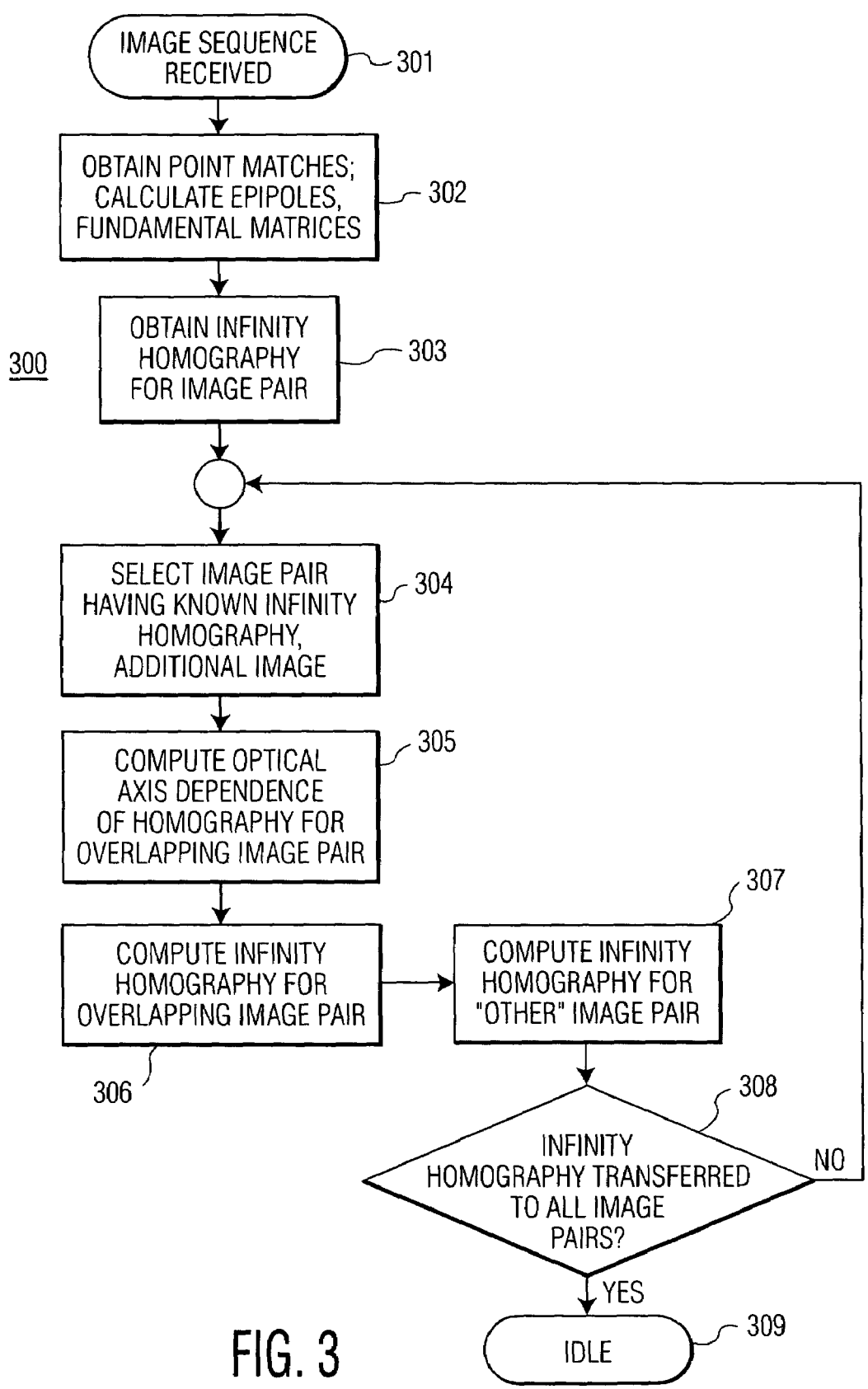
FIG. 3 is a high level flowchart for a process of computing homography transfer utilizing point matches according to one embodiment of the present invention.
Figure 4A:
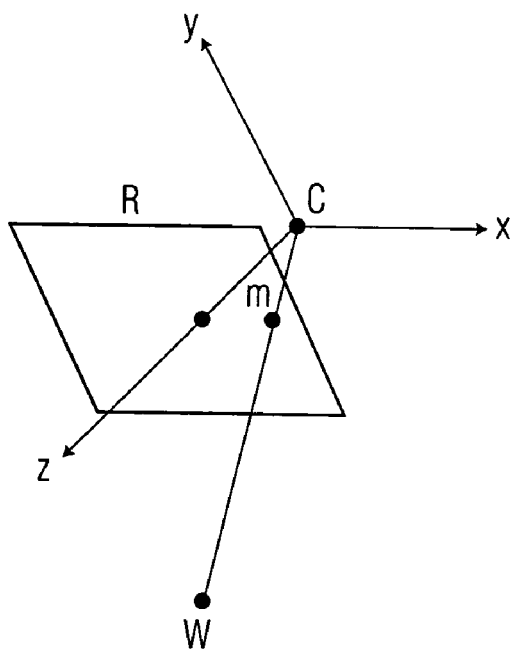
FIGS. 4A and 4B depict models for computing epipolar geometry and homography.
Figure 4B:
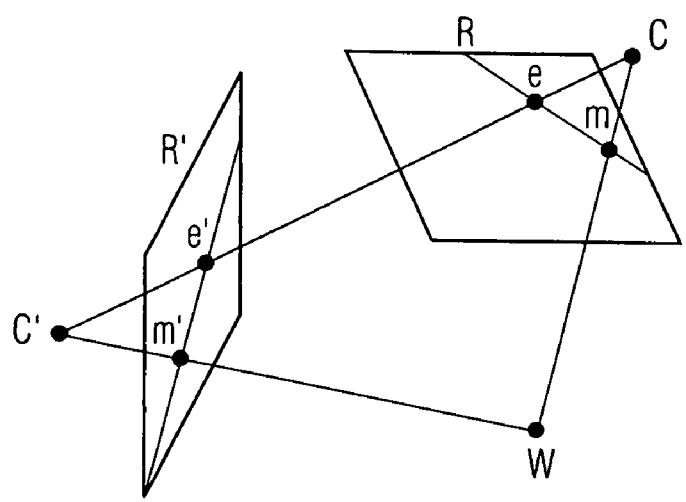

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a block diagram of a video system employing a method of homography transfer utilizing point matches according to one embodiment of the present invention. Video system 100 includes a video receiver, which may be a computer or other data processing system; a satellite, terrestrial or cable broadcast television receiver; a set top box; or a video game unit. Video receiver 101 has an input 103 for receiving a sequence of images and an optional output 104 for transmitting processed image data to, for example, a display or recording device.

Video receiver 101 in the exemplary embodiment includes an image processor 104 computing homography transfer using point matches for the received sequence of images as described in further detail below. Video receiver 101 may also optionally include a memory 105 for storing the received sequence of images, computed homography information, or other data, and a display 106 for displaying images or image sequences modified utilizing the computed homography information. For example, image processor may be employed in depth reconstruction, body modeling, or image morphing for three dimensional (3D) television, and may generate altered image sequences based on received image sequences to display a scene from a different perspective.

Those skilled in the art will recognize that the complete structure and operation of a video receiver is not depicted or described herein. Instead, only so much of the structure and operation of a video receiver as is either unique to the present invention or necessary for an understanding of the present invention is depicted in the figures and described. The remainder of the structure and operation of a suitable video receiver may be conventional, although in the present invention the video receiver computes homography information for the received image sequence as described in further detail below.

FIG. 2 depicts image data employed in computing homography transfer utilizing point matches according to one embodiment of the present invention. A sequence 200 of images $I_1, I_2, I_3, \ldots I_n$ (where n is any positive nonzero integer) is received by image processor 104. Also received by image processor 104, or alternatively, computed by image processor 104, is a tabulation 201 of point matches between any given pair of images within the image sequence 200 and a homography 202 at the plane of infinity (or "infinity homography") for two consecutive images within the image sequence 200.

Without loss of generality, the infinity homography 202 is assumed to be for the first two consecutive images $I_1$ and $I_2$ within image sequence 200, and homography transfer according to the present invention will be described for the first three images: $I_1, I_2$ and $I_3$. Since point matches between all three images are known, computation of epipoles $e_{ij}$ and fundamental matrices $F_{ij}$ between any image pair within the set of images $I_1, I_2$ and $I_3$ is straightforward, and may be performed using any of the applicable methods known in the art.

As known in the art, arbitrary homographies (for an arbitrary plane z) between two images i,j are related to epipoles $e_{ij}$ and fundamental matrix $F_{ij}$ for those images by the expression:

$$F_{ij} = [e_{ij}]_x H_{ij} \qquad (1)$$

is derived from where $H_{ij}$ is a rank 2 homography and the epipolar vector $e_{ij}$ by:

$$[e_{ij}]_x = \begin{bmatrix} 0 & -e_3 & e_2 \\ e_3 & 0 & -e_1 \\ -e_2 & e_1 & 0 \end{bmatrix}.$$

Homography $H_{ji}$ is similarly related to epipoles $e_{ji}$ and fundamental matrix $F_{ji}$. Since epipoles $e_{ij}$ and $e_{ji}$, fundamental matrices $F_{ij}$ and $F_{ji}$, and homographies $H_{ij}$ and $H_{ji}$ are defined only up to a scale, an additional constraint that each of these vectors/matrices have a norm equal to 1 is introduced.

It is also known in the art (although not very widely employed) that an arbitrary homography $H_{ij}$ between two images may be written as:

$$H_{ij} = c'_{ij} H_{ij\infty} + e_{ij} z'^T_{ij} \qquad (2)$$

where $C'_{ij}$ is an unknown scalar, $H_{ij\infty}$ is the infinity homography mapping image points from image i to corresponding image points within image j, and $$z'^T_{ij}$$

is the transpose of an unknown vector. Equation (2) may be equivalently written:

$$H_{ij\infty} = c_{ij} H_{ij} + e_{ij} z^T_{ij} \qquad (3)$$

where $c_{ij}$ is an unknown scalar and $z'_{ij}$ is the unknown vector.

Finally, it is known in the art that infinity homographies between three arbitrary images i,j,k are related by the following:

$$H_{ik\infty} = H_{jk\infty} H_{ij\infty}. \quad (4)$$

As noted above, point matches between any image pair within the image sequence 200 are known or may be readily computed (e.g., by sparse optical flow computation), and therefore epipoles and fundamental matrices may be easily determined. Furthermore, at least one infinity homography for an image pair ($H_{12\infty}$ between the first two consecutive images in the exemplary embodiment) within image sequence 200 is known or may be calculated. Since computation of infinity homographies for two images is very difficult, often requiring manual intervention where decisions or judgments must be made (which is impractical for image sequences of any significant size), the present invention computes all infinity homographies between any image pair within image sequence 200 from the point matches 201 and the known infinity homography 202.

Equations (1) through (4) hold for any arbitrary image set i,j,k, so without loss of generality those variables may be set as i=1, j=2 and k=3 (i.e., using images $I_1$, $I_2$ and $I_3$). Substituting equation (3) into equation (4) obtains:

$$c_{13} H_{13} + e_{13} z_{13}^T = (c_{23} H_{23} + e_{23} z_{23}^T) H_{12\infty}. \quad (5)$$

By multiplying both sides of the equation with the matrix $[e_{13}]_x$ and noticing that $[e_{13}]_x e_{13} = 0$ and $[e_{13}]_x H_{13} = F_{13}$ results in:

$$c_{13} F_{13} = (c_{23} [e_{13}]_x H_{23} + [e_{13}]_x e_{23} z_{23}^T) H_{12\infty},$$

which may be equivalently written as:

$$c_{23} [e_{13}]_x H_{23} + [e_{13}]_x e_{23} z_{23}^T = c_{13} F_{13} H_{12\infty}^{-1}. \quad (6)$$

Equation (6) is a linear equation in $c_{23}$ and $z_{23}$ which may be easily solved (it may be shown that the corresponding matrix has rank 4). Once $C_{23}$ and $z_{23}$ are determined, infinity homography $H_{23\infty}$ may be computed from equations (1) and (3) and infinity homography $H_{13\infty}$ may be computed if desired from equation (4). The process may then be repeated for images $I_2$, $I_3$ and $I_4$ utilizing point matches for those images and infinity homography $H_{23\infty}$, and then successively repeated in like manner for all remaining images within image sequence 200.

Those skilled in the art will recognize that equations (1), (3) and (4) may be employed to interpolate as well as extrapolate infinity homography transfer—that is, infinity homographies $H_{12\infty}$ and $H_{23\infty}$ may be determined utilizing point matches and infinity homography $H_{13\infty}$ by solving $$(c_{12} F_{12})^{-1} = (c_{23} [e_{12}]_x H_{23} + [e_{12}]_x e_{23} z_{23}^T) H_{13\infty}^{-1}$$

for $c_{23}$ and $z_{23}$, then using equations (1), (3) and (4) as described above.

Moreover, while the exemplary embodiment employed an infinity homography $H_{12\infty}$ between the first two consecutive images $I_1$ and $I_2$ within image sequence 200 and computed infinity homography transfers proceeding forward through the image sequence 200, an infinity homography for any consecutive image pair located anywhere within the image sequence 200 may be employed, and infinity homography transfers may be computed proceeding both/either forward and/or backward through the image sequence 200. For instance, if infinity homography $H_{23\infty}$ had been known in the above example rather than infinity homography $H_{12\infty}$, infinity homographies $H_{12\infty}$ and $H_{13\infty}$ may be determined by solving either $$c_{13} F_{13} = H_{23\infty}(c_{12} [e_{13}]_x H_{12} + [e_{13}]_x e_{12} z_{12}^T)$$

for $c_{12}$ and $z_{12}$ or $$(c_{12} F_{12})^{-1} = (c_{13} [e_{12}]_x H_{13} + [e_{12}]_x e_{13} z_{13}^T) H_{23\infty}^{-1}$$

for $c_{13}$ and $z_{13}$, then using equations (1), (3) and (4) as described above.

This flexibility in infinity homography transfer according to the present invention allows an image sequence to be received, point matches (and epipoles and fundamental matrices) between image pairs computed, and any (not necessarily consecutive) image pair selected to compute a first infinity homography, which is then transferred to the remaining image pairs as described above. The image pair employed to compute the initial infinity homography may therefore be selected for ease in calculating that initial infinity homography.

Those skilled in the art will further recognize that point matches, epipoles and fundamental matrices need not be computed for all unique image pairs within image sequence 200 to transfer infinity homographies according to the present invention. For example, point matches between images $I_1$ and $I_7$ are not necessary unless an infinity homography between images $I_1$ and $I_7$ is required. Since infinity homographies are generally only required between sequential images, point matches, epipoles and fundamental matrices need only be calculated for all unique image pairs for each set of three consecutive images within image sequence 200 (i.e., $I_1$, $I_2$ and $I_3$; $I_2$, $I_3$ and $I_4$; $I_3$, $I_4$ and $I_5$; . . . ; $I_{n-2}$, $I_{n-1}$ and $I_n$). Similarly, infinity homographies for pairs of nonconsecutive images (e.g., $H_{13\infty}$) need not necessarily be calculated.

FIG. 3 is a high level flowchart for a process of computing homography transfer utilizing point matches according to one embodiment of the present invention. The process 300 begins with receipt of the image sequence for which homography transfer is to be performed (step 301). Point matches for (at least selected) image pairs within the received image sequence are first obtained, either by calculation or receipt/retrieval, and epipoles and fundamental matrices are calculated from the point matches (step 302).

An infinity homography for one image pair within the image sequence is then obtained, either by calculation or receipt/retrieval (step 303), then an image set including both the image pair for which the infinity homography is known and a third image is selected (step 304). The selected image set will include three image pairs: the image pair for which an infinity homography is known (i.e., $I_1$ and $I_2$ in the example above); and two "overlapping" image pairs (image pairs including an image from the image pair for which the infinity homography is known, or image pairs $I_2/I_3$ and $I_1/I_3$ in the example above).

The intermediate transfer parameters of an infinity homography for one of the overlapping pairs is then computed utilizing the known infinity homography (step 305). These intermediate parameters includes a scalar ($c_{ij}$) multiple for the infinity homography for that overlapping pair ($H_{ij\infty}$) and a vector ($z_{ij}$) multiple for epipoles for that overlapping pair ($e_{ij}$). The intermediate transfer parameters are then utilized to compute the infinity homography for the selected overlapping image pair (step 306), which may be used in turn to compute the infinity homography for the other overlapping image pair within the selected image set (step 307), if desired.

The homography transfer process (steps 304–307) is then repeated until all image pairs—or at least all image pairs for which infinity homographies are desired—have been selected (step 308) together with an overlapping image pair for which an infinity homography is known. The process then becomes idle until another image sequence is received (step 309) for homography transfer according to the present invention.

The present invention allows infinity homographies for at least all consecutive image pairs within an image sequence to be computed from a single known infinity homography and (sufficient) point matches between the subject image pairs. The algorithm of the present invention is far simpler compared to computing infinity homographies independently for each subject image pair, and is therefore extremely useful for any three dimensional video application.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for transferring a known infinity homography, comprising:
    an image processor processing an image sequence, the image sequence comprising two images to which the known infinity homography applies and an additional image, wherein the image processor:
        selects an image pair from the image sequence, the selected image pair including one of the two images to which the known infinity homography applies and the additional image determines intermediate transfer parameters for a homography for the selected image pair; and
        derives an infinity homography for the selected image pair from the known infinity homography.

2. The system according to claim 1, wherein the image processor determines a scalar multiple for the homography for the selected image pair and a vector multiple of epipoles for the selected image pair.

3. The system according to claim 1, wherein the additional image is sequential within the image sequence to one of the two images to which the known infinity homography applies.

4. The system according to claim 1, wherein the two images to which the known infinity homography applies are consecutive images within the image sequence.

5. The system according to claim 1, wherein the two images to which the known infinity homography applies are consecutive images i,j within the image sequence, the additional image is image k consecutive with images i,j within the image sequence, wherein the image processor solves $$c_{jk}[e_{ik}]_x H_{jk} + [e_{ik}]_x e_{jk} z_{jk}^T = c_{ik} F_{ik} H_{ij\infty}^{-1},$$

where $H_{jk}$ is a homography for images j,k, $c_{jk}$ is a scalar multiple for the homography $H_{jk}$, $e_{jk}$ are epipoles for images j,k, $$z_{jk}^T$$

is a transpose of an unknown vector multiple for the epipoles $e_{jk}$, $[e_{ik}]_x$ is derived from the epipoles $e_{ik}$ for images i,k, $c_{ik}$ is a scalar multiple for a homography $H_{ik}$ for images i,k, $F_{ik}$ is a fundamental matrix for images i,k, and $$H_{ij\infty}^{-1}$$

is an inverse of the known infinity homography.

6. The system according to claim 1, wherein the known infinity homography relates image points for a second image within the image sequence to image points for a first image within the image sequence.

7. A system for processing an image sequence, comprising:
    a video system including an input for receiving the image sequence, the image sequence comprising two images to which a known infinity homography applies and an additional image; and
    an image processor within the video system processing the image sequence, wherein the image processor:
        selects an image pair from the image sequence, the selected image pair including one of the two images to which the known infinity homography applies and the additional image determines intermediate transfer parameters for a homography for the selected image pair; and
        derives an infinity homography for the selected image pair from the known infinity homography.

8. The system according to claim 7, wherein the image processor determines a scalar multiple for the homography for the selected image pair and a vector multiple for epipoles for the selected image pair.

9. The system according to claim 7, wherein the additional image is sequential within the image sequence to one of the two images to which the known infinity homography applies.

10. The system according to claim 7, wherein the two images to which the known infinity homography applies are consecutive images within the image sequence.

11. The system according to claim 7, wherein the two images to which the known infinity homography applies are consecutive images i,j within the image sequence, the additional image is image k consecutive with images i,j within the image sequence, wherein the image processor solves $$c_{jk}[e_{ik}]_x H_{jk} + [e_{ik}]_x e_{jk} z_{jk}^T = c_{ik} F_{ik} H_{ij\infty}^{-1},$$

where $H_{jk}$ is a homography for images j,k, $c_{jk}$ is a scalar multiple for the homography $H_{jk}$, $e_{jk}$ are epipoles for images j,k, $$z_{jk}^T$$

is a transpose of an unknown vector multiple for the epipoles $e_{jk}$, $[e_{ik}]_x$ is derived from the epipoles $e_{ik}$ for images i,k, $c_{ik}$ is a scalar multiple for a homography $H_{ik}$ for images i,k, $F_{ik}$ is a fundamental matrix for images i,k, and $$H_{ij\infty}^{-1}$$

is an inverse of the known infinity homography.

12. The system according to claim 7, wherein the known infinity homography relates image points for a second image within the image sequence to image points for a first image within the image sequence.

13. A method for transferring a known infinity homography for two images within an image sequence to other image pairs within the image sequence, comprising the steps of:
  selecting an image pair from the image sequence, the selected image pair including one of the two images to which the known infinity homography applies and an additional image within the image sequence determining intermediate transfer parameters for a homography for the selected image pair; and
  deriving an infinity homography for the selected image pair from the known infinity homography.

14. The method according to claim 13, wherein the step of determining intermediate transfer parameters for a homography for the selected image pair further comprises:
  determining a scalar multiple for the homography for the selected image pair and a vector multiple for epipoles for the selected image pair.

15. The method according to claim 13, wherein the step of selecting an image pair from the image sequence further comprises:
  selecting the additional image from images sequential within the image sequence to one of the two images to which the known infinity homography applies.

16. The method according to claim 13, wherein the two images to which the known infinity homography applies are consecutive images within the image sequence.

17. The method according to claim 13, wherein the two images to which the known infinity homography applies are consecutive images i,j within the image sequence, the additional image is image k consecutive with images i,j within the image sequence, and wherein the step of deriving an infinity homography for the selected image pair from the known infinity homography further comprises:
  solving $$c_{jk}[e_{ik}]_x H_{jk} + [e_{ik}]_x e_{jk} z_{jk}^T = c_{ik} F_{ik} H_{ij\infty}^{-1},$$

where $H_{jk}$ is a homography for images j,k, $c_{jk}$ is a scalar multiple for the homography $H_{jk}$, $e_{jk}$ are epipoles for images j,k, $$z_{jk}^T$$

is a transpose of an unknown vector multiple for the epipoles $e_{jk}$, $[e_{ik}]_z$ is derived from the epipoles $e_{ik}$ for images i,k, $c_{ik}$ is a scalar multiple for a homography $H_{ik}$ for images i,k, $F_{ik}$ is a fundamental matrix for images i,k, and $$H_{ij\infty}^{-1}$$

is an inverse of the known infinity homography.

* * * * *